UNITED STATES PATENT OFFICE.

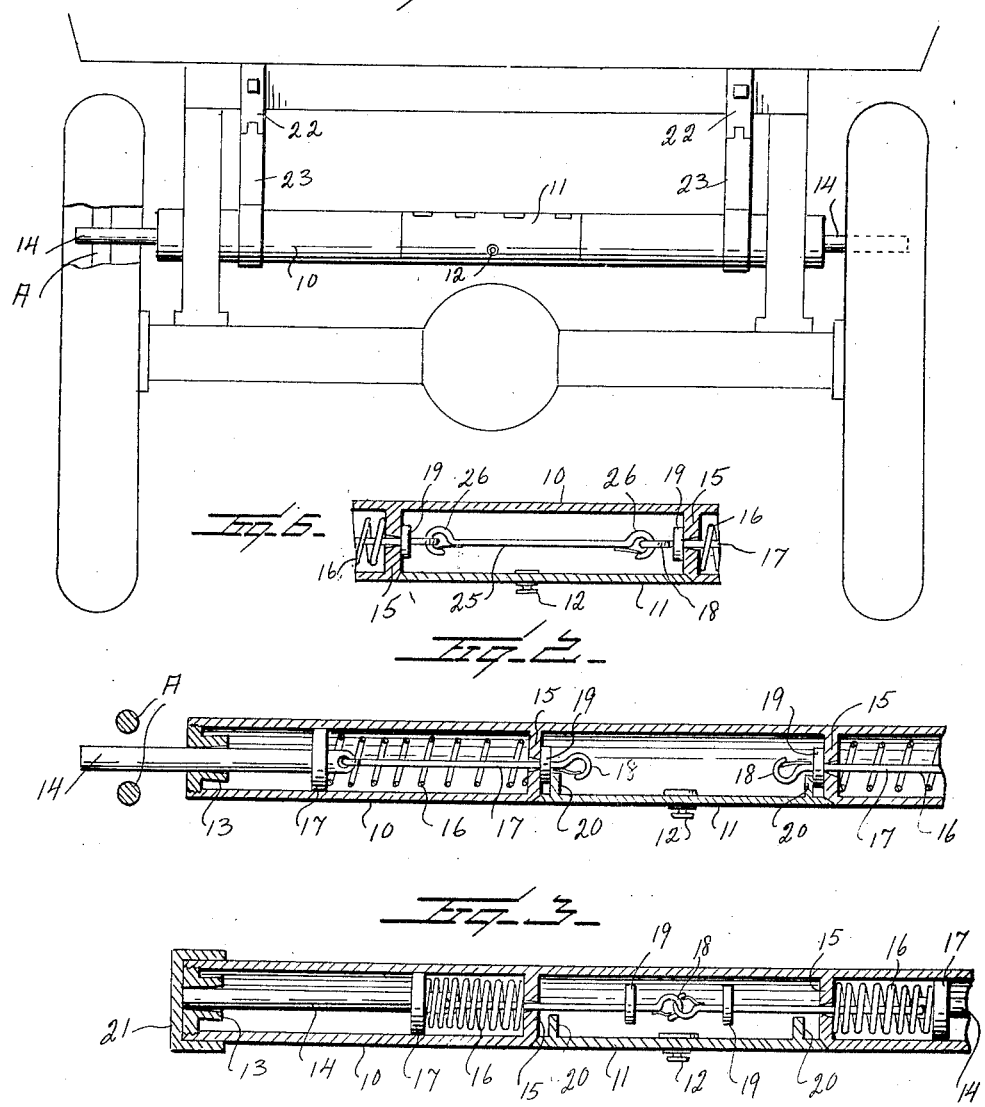

THEODORE C. FISCHER, OF PHILADELPHIA, PENNSYLVANIA.

AUTOMOBILE-LOCK.

1,346,371.  Specification of Letters Patent.  Patented July 13, 1920.

Application filed April 23, 1919. Serial No. 292,078.

*To all whom it may concern:*

Be it known that I, THEODORE C. FISCHER, a citizen of Germany, residing at Philadelphia, in the county of Philadelphia and State of Pennsylvania, have invented certain new and useful Improvements in Automobile-Locks, of which the following is a specification, reference being had to the accompanying drawings.

This invention relates to devices for locking automobiles, and particularly to means for locking the wheels thereof so as to prevent the unauthorized use of the automobile.

The general object of the invention is to provide a very simple mechanism for this purpose which may be attached to all makes of automobiles, which will not be unsightly, and which is very simply constructed.

A further object is to provide a device of this character comprising a casing adapted to be mounted either on the front or rear of the automobile, or in any other suitable position, this casing carrying two normally retracted bolts with springs therein whereby, when the bolts are released from their retracted position, the springs will cause the bolts to be forced laterally outward between the spokes of an automobile to thereby prevent rotation of the wheels thereof, the casing having a door which must be opened to permit the retraction of the bolts and preventing the accidental or unauthorized opening of the door.

Other objects have to do with the details of construction and arrangement of parts, as will appear in the accompanying description.

My invention is illustrated in the accompanying drawings, wherein:—

Figure 1 is a rear view of an automobile showing my locking device applied thereto;

Fig. 2 is a fragmentary longitudinal sectional view of the locking mechanism with the bolts projected;

Fig. 3 is a like view to Fig. 2, but showing the bolts retracted;

Fig. 4 is an elevation of the supporting bracket, the casing being in section;

Fig. 5 is a like view to Fig. 4, but showing a modified form of supporting bracket; and Fig. 6 is a fragmentary sectional view of the casing showing a modified form of locking stop.

Referring to these drawings, it will be seen that my locking device comprises a casing, designated 10, which is adapted to be attached firmly to an automobile body either at the front or rear thereof, or in any other suitable position where access thereto may be conveniently had, this casing having an opening in its middle, the opening being normally closed by a door 11. This door is locked when closed by any suitable locking mechanism, preferably by a keyless combination lock, designated 12. At the outer ends of the casing are disposed guide thimbles 13 extending into the casing any desired distance. Extending longitudinally through the casing are the bolts 14, these bolts at their outer ends fitting within the guide thimbles and being slidable therein.

Surrounding the bolts are coiled expansion springs 16 bearing against shoulders 17 on the bolts and urging the bolts outward. The bolts are provided at their inner adjacent ends with hooks so constructed that the bolts may be hooked into engagement with each other, when the springs are retracted and under compression to thereby hold the bolts retracted or whereby the bolts may be unhooked from each other to permit the projection of the bolts. I have illustrated each bolt 14 as provided with a relatively light shank 17 which passes through the wall 15 and is provided with hooks 18. I do not wish to be limited to this, however, but by forming these shanks of relatively light material, swiveled, linked, or otherwise loosely connected to the bolt proper, I provide for sufficient movement of the shanks 17 to cause the hooks 18 to interlock with each other. I do not wish to be limited to the particular character of the hooks. Preferably, there is provided a shoulder 19 inward of each hook 18 which, when the bolts are projected, will bear against the walls 15 and preferably the lid or cover 11 is provided with corresponding shoulders 20 which, when the lid or cover is closed down and the bolts are projected, will bear against the inside faces of the shoulders 19 and positively lock the bolts from any inward movement. When this cover or lid is raised, however, then it is possible to retract the bolts against the action of the springs and hook them together, thus holding the bolts retracted.

The casing is to be so disposed that the bolts will be projected between the spokes A of the front wheels or of the rear wheels, depending upon the position of the locking device. I have illustrated it as applied to the rear wheels of the machine, but this is purely illustrative. Preferably, caps 21 may be provided which will fit over the open ends of the casing and close the same when the lock is not in use. This, however, is not a necessary feature.

I do not wish to be limited to any particular means for mounting this casing upon the body or frame of the automobile, but I have shown as a preferable construction for this purpose an attaching bracket 22 which is bolted, riveted, or otherwise attached to the body of the automobile and extends down therefrom, and which has pivoted to its lower end a swinging section 23 having a band or clamp encircling the tubular casing 10. By this means, the tubular casing may be shifted to a limited degree in one direction or the other so that in case a spoke of the wheel should come immediately in front of the end of the tubular casing, the casing may be shifted so that the bolts may be projected between the spokes.

In Fig. 5, I show another form in which the bracket 24 is formed of two sections vertically adjustable with reference to each other, the lower section being formed to embrace the casing. By this last construction, the bolts may be projected between the spokes either nearer to or farther from the hub of the wheel, as may be desired. It is obvious that the casing and the bolts may be of any desired size, depending upon the construction desired. The bolts may be relatively light or relatively heavy. The outer casing may be made of heavy steel tubing having a diameter of three or four inches and a thickness of half an inch, and the bolts may be from two to three inches in diameter or less or more, depending upon the diameter of the casing. While the springs will automatically project the bolts when the shanks of the bolts are released from each other, I do not wish to be limited to the use of springs, as it would be possible to shift the bolts outward by hand and then close the lid, whereby the bolts would be locked from any inward movement by the lugs or shoulders 19 and 20. On the other hand, these lugs or shoulders might be omitted and springs used for the purpose of projecting the bolts and holding them projected. Or the construction shown in Fig. 6 might be used, in which the hooks 18, when the bolts are projected, are held apart and against inward movement by means of a rod 25, having snap hooks 26 at the ends which engage with the eyes 18. This rod with its snap hooks normally lies in the bottom of the casing but is put in place when the bolts have been projected. In this case, of course, the lugs 20 are left off. It is obvious that many changes might be made in the details of construction and arrangement of parts without departing from the spirit of the invention.

I claim:—

1. A locking device for automobiles comprising a tubular casing open at both ends, a pair of bolts disposed within the casing and projectable therefrom into a position between the spokes of a pair of automobile wheels, and means for holding the bolts from retraction, said means comprising a member carried by the casing and shiftable into or out of a locking position and when in locking position preventing the retraction of the bolts, and means for locking said member in its locking position.

2. A locking device for automobiles comprising a tubular casing open at both ends, a pair of bolts disposed within the casing and projectable therefrom into a position between the spokes of a pair of automobile wheels, springs urging said bolts outward, and means for holding the bolts retracted against the action of the springs, means for holding the bolts projected, said means comprising a member carried by the casing and shiftable into or out of a locking position and when in locking position preventing the retraction of the bolts, and means for locking said member in its locking position.

3. A locking device for automobiles comprising a tubular casing open at both ends, a pair of bolts disposed in the casing and projectable from the open ends thereof, springs normally urging said bolts outward, the bolts having shanks extending through the springs and engageable with each other when the bolts are retracted against the force of the springs, a door on the casing permitting access to the shanks whereby they may be released or engaged with each other, and means for locking the door in its closed position.

4. A locking device for automobiles comprising a tubular casing open at both ends, a pair of bolts disposed in the casing and projectable from the open ends thereof, springs normally urging said bolts outward, the bolts having shanks extending through the springs and engageable with each other when the bolts are retracted against the force of the springs, a door on the casing permitting access to the shanks whereby they may be released or engaged with each other, and means for locking the door in its closed position, the shanks on the bolts being provided with shoulders and the door being provided with shoulders engaging all the shank shoulders when the bolts are projected and the door is closed.

5. A locking device for automobiles comprising a casing having open ends, bolts carried by the casing and projectable therefrom for engagement with the spokes of an automobile wheel, means attached to the inner ends of the bolts whereby they may be engaged with each other when they are retracted to prevent the projection of the bolts until they are disengaged, and a door in the casing giving access to the interior thereof and having a lock to thereby prevent the unauthorized detachment of the bolts from each other.

6. A locking device for automobiles comprising a casing having an open end, a bolt carried in the casing and projectable through the open end into engagement with an automobile wheel to lock it, a door in the casing giving access to the interior thereof, a lock for said door, and means carried by the door engageable with the bolt when the bolt is projected and the door is shut for preventing the retraction of the bolt.

7. A locking device for automobiles comprising a casing having an open end, a bolt longitudinally shiftable within the casing and projectable through its open end into engagement with an automobile wheel, a door forming part of the casing and giving access thereto and when open disclosing the inner end of said bolt, means for locking said door in a closed position, and a member normally disposed entirely within the casing and when within the casing engageable with the bolt when the latter is projected to prevent its retraction, said member when removed from engagement with the bolt permitting the retraction of the bolt.

8. A locking device for automobiles comprising a tubular casing having an open end, a bolt longitudinally shiftable within the casing and projectable from its open end into engagement with an automobile wheel, a spring in the casing urging the bolt to a projected position, a door forming part of the casing and giving access to the inner end of the bolt whereby the bolt may be retracted, and means for locking said door in a closed position.

In testimony whereof I hereunto affix my signature in the presence of two witnesses.

THEODORE C. FISCHER.

Witnesses:
    FLORIEN SCHYMANSKI,
    CHAS. F. FICHTNER.